P. KRIEGER, Sr.
VEHICLE.
APPLICATION FILED JULY 20, 1920.
1,390,567.
Patented Sept. 13, 1921.
2 SHEETS—SHEET 1.
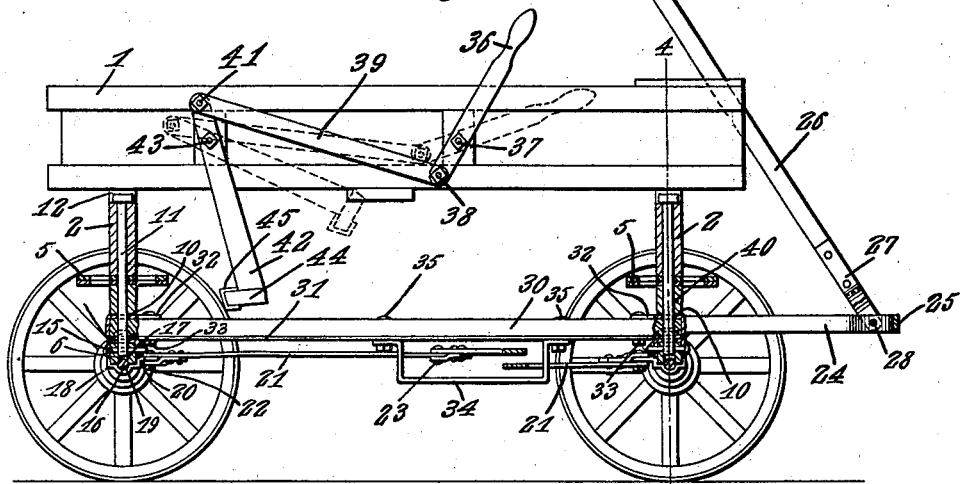
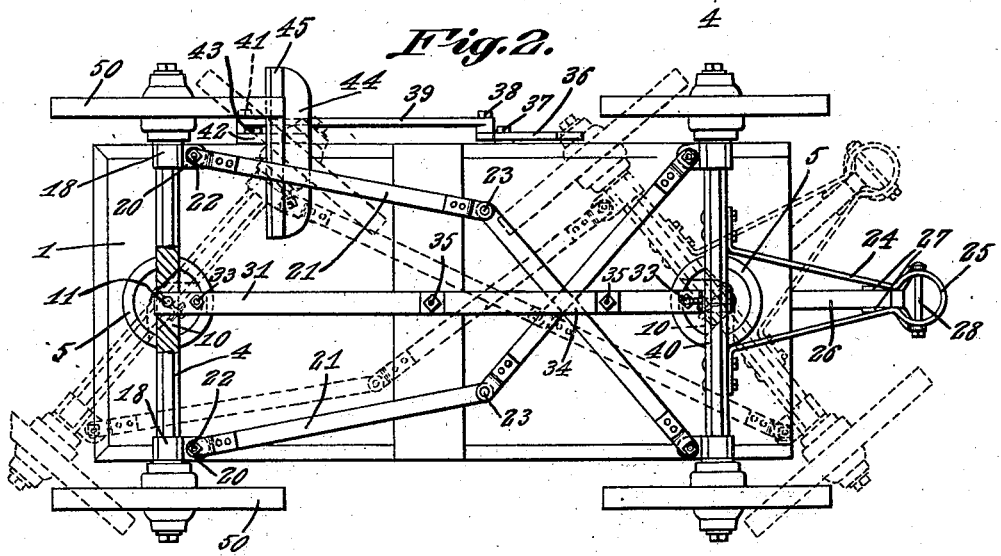
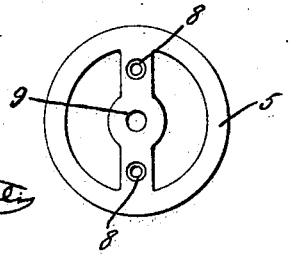
P. Krieger Sr., Inventor
Witness
By C. A. Snow & Co.
Attorneys

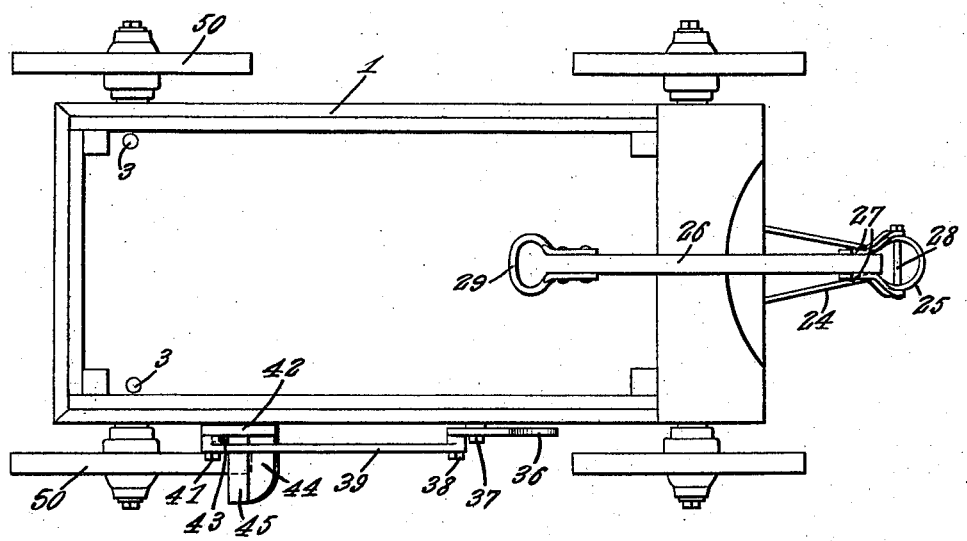
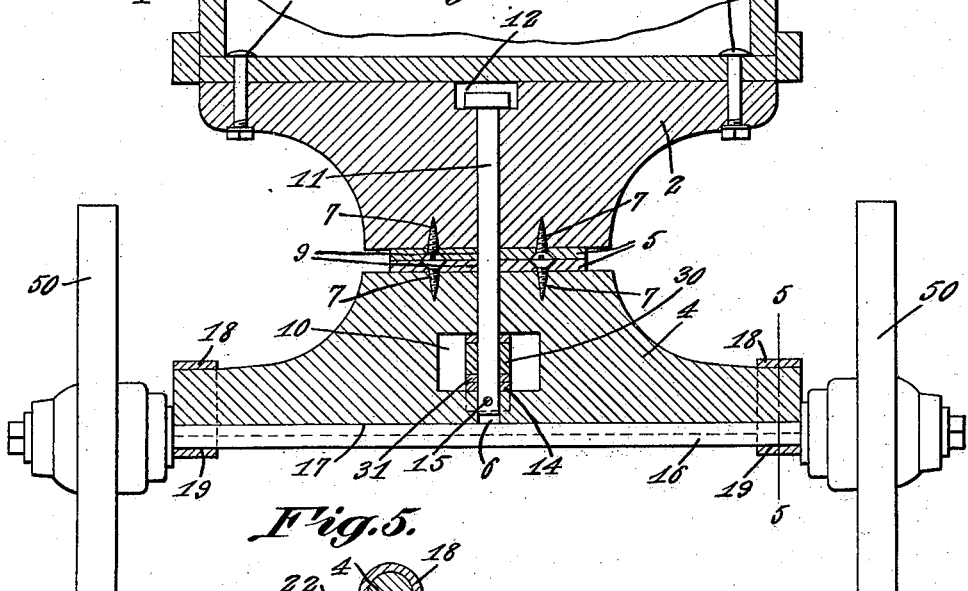

UNITED STATES PATENT OFFICE.

PETER KRIEGER, SR., OF PATERSON, NEW JERSEY.

VEHICLE.

1,390,567.  Specification of Letters Patent.  Patented Sept. 13, 1921.

Application filed July 20, 1920. Serial No. 397,647.

*To all whom it may concern:*

Be it known that I, PETER KRIEGER, Sr., a citizen of the United States, residing at Paterson, in the county of Passaic and State of New Jersey, have invented a new and useful Vehicle, of which the following is a specification.

The device forming the subject matter of this application is a vehicle, ordinarily made in small form and adapted to be used by children, although the novel features hereinafter described may be embodied in a vehicle of any sort.

The invention aims to provide novel means for connecting the front and rear axles of the vehicle, so that movement may be imparted from one axle to the other, thereby to swing the axles on their king bolts, thus enabling the vehicle to make a short turn.

Another object of the invention is to improve the brake mechanism.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a vehicle constructed in accordance with the invention, parts appearing in section, and parts being broken away; Fig. 2 is a bottom plan wherein parts appear in section; Fig. 3 is a top plan; Fig. 4 is a transverse section on the line 4—4 of Fig. 1; Fig. 5 is a section taken on the line 5—5 of Fig. 4; and Fig. 6 is a plan showing one of the fifth wheel members.

The vehicle forming the subject matter of this application includes a body 1 which may be constructed as desired. Front and rear bolsters 2 are provided, the bolsters being connected at their ends, by securing elements 3 to the bottom of the body 1. The numeral 4 denotes a rear axle coöperating with the rear bolster. On the bottom of the rear bolster 2 and on the upper edge of the rear axle 4 of the front wheel 4, plates 5 are mounted and are held in place by securing elements 7. The plates 5 have openings 8 for the securing elements 7, each plate having a central opening 9. In the bolster 2, an opening 10 is fashioned, the opening flaring as it extends forwardly, this detail being disclosed in Fig. 2 of the drawings. A king bolt 11 passes downwardly through the bolster 2, through the openings 9 in the members 5, and through the axle 4, the bolt extending across the opening 10. The upper edge of the rear bolster 2 is provided with a recess 12 in which the head of the king bolt 11 is located. The lower end of the king bolt 11 is received in an opening 6 formed in the lower portion of the axle 4, the opening 6 communicating with the opening 10. A U-shaped member 14 is located in the opening 10 and is straddled on that portion of the axle 4 which is located below the opening 10, the king bolt 11 passing downwardly through the top of the member 14. A securing element 15 passes through the axle 4 and through the ends of the U-shaped member 14, the securing element passing, also, through the lower end of the king bolt 11, and serving to hold the king bolt in place. A rod 16 extends along the lower edge of the axle 4, the axle having a longitudinal groove or seat 17 wherein a rod 16 fits. Clips 18 are mounted on the ends of the axle 4 and are provided with seats 19 which coöperate with the seats or grooves 17 to retain and hold the rod 16. Wheels 50 are journaled and held on the ends of the rod 16. The clips 18 have ears 20.

The front axle 40 is constructed and mounted like the rear axle 4. Crossed foldable members 21 are provided, the rear ends of the members 21 being pivoted at 22 to the ears 20 on the rear axle 4, the forward ends of the foldable members being pivoted, in a similar way, to the ears on the forward axle 40. Each of the members 21 comprises front and rear parts which are pivotally connected as indicated at 23.

Forwardly converging hounds 24 are secured at their rear ends to the front axle 40, the hounds merging into an eye 25 which may be of circular outline. The numeral 26 denotes a tongue provided at its lower ends with arms 27 spanning the eye 25 and connected thereto by a pivot element 28. The tongue 26 may be extended in front of the body 1, for the purpose of drawing the vehicle about, or, if desired, the tongue 26 may be extended rearwardly, so as to overhang the body 1, the tongue, under the condition last above mentioned, being used for steering the vehicle, while the operator of the vehicle is coasting. When desired, a swinging movement may be imparted to the front axle 40, by way of the tongue 26, and when the front axle is swung swinging movement will be imparted to the rear axle 4, through the instrumentality of the crossed foldable members 21, both of the axles 40 and 4 being swung at once into the dotted line position of Fig. 2 of the drawings, thus enabling the vehicle to make a short turn. The handle 16 is supplied at its upper end with a grip 29, of any desired sort.

The numeral 30 denotes a reach, the ends of which extend into openings 10 of the axles 4 and 40. A reinforcing strip 31 extends along the lower edge of the reach 30, the ends 32 of the reinforcing strip being extended upwardly across the ends of the reach 30, and being overlapped on the top of the reach. A strip 31 is in contact with the upper portions of the U-shaped members 14, and a wearing surface of metal upon metal is provided. The king bolts 11 extend downwardly through the ends 32 of the strip 31, through the ends of the reach 30, and through the body portion of the strip 31. The strip and its ends, therefore, afford a secure mounting for the ends of the reach 30 on the king bolts 11. Securing members 33 pass through the ends 32 of the strip 31, through the ends of the reach 30 and through the body portion of the strip 31. The numeral 34 denotes a U-shaped guard, the ends of which bear against the reinforcing strip 31. Securing devices 35 pass through the reach 30, through the ends of the guard 34 and through the strip 31. The foldable members 21 operate through the guard 34.

A brake mechanism is provided, the same including a lever 36 fulcrumed at 37 on the body 1 and pivoted at 38 to a link 39 which, in its turn, is pivoted at 41 to the upper end of a lever 42 fulcrumed at 43 intermediate its ends, on the body 1. A foot 44 is secured to the lower end of the lever 42 and is provided with a shoe 45 adapted to bear against one of the rear wheels. The foot 44 and the shoe 45 are long enough so that these parts may exercise their functions regardless of the extent to which the rear axle 4 has been swung on the corresponding king bolt 11.

The structure forming the subject matter of this application is a strong and compact vehicle, well designed for the purposes intended, and adapted to withstand severe usage.

A mechanic can make changes in the structure shown without placing the utility of the vehicle in jeopardy, although the drawings disclose the preferred embodiment of the invention.

Having thus described the invention, what is claimed is:—

1. A vehicle comprising a body; bolsters on the body; front and rear axles coöperating with the bolsters and having openings; a reach having its ends disposed in the openings; king bolts connecting the axles with the bolsters, the king bolts extending across the openings, and the ends of the reach being mounted on the king bolts; rods extended along the axles; clips on the axles and retaining the rods on the axles; ground wheels on the rods; and crossed foldable members having their ends pivoted to the clips of the front and rear axles.

2. A vehicle comprising a body; bolsters on the body; axles provided with openings; U-shaped members located in the openings and straddled on the axles; king bolts connecting the axles with the bolsters and passing downwardly through the tops of the U-shaped members; securing elements passing through the king bolts and having their ends mounted in the ends of the U-shaped members; a reach having its ends disposed in the openings and mounted on the king bolts, the reach being supported on the tops of the U-shaped members; ground wheels carried by the axles; and crossed foldable members connecting the axles.

3. A vehicle comprising a body; bolsters on the body; axles provided with openings; a reach having its ends disposed in the openings; a reinforcing strip extended along one edge of the reach, the strip including end portions prolonged around the ends of the reach and overlapped on the opposite edge of the reach; king bolts connecting the axles with the bolsters, the king bolts passing through the ends of the strips, through the reach, and through the body portion of the strip; ground wheels mounted on the axles; and crossed foldable members having their ends pivoted to the axles.

In testimony that I claim the foregoing as my own, I have hereto affixed my signature in the presence of two witnesses.

PETER KRIEGER, Sr.

Witnesses:
 JOSEPH BANKER,
 JAMES FITZPATRICK.